US 11,685,368 B2

(12) United States Patent
Jeong

(10) Patent No.: US 11,685,368 B2
(45) Date of Patent: Jun. 27, 2023

(54) APPARATUS FOR CONTROLLING TURNING OF VEHICLE, SYSTEM HAVING THE SAME, AND METHOD THEREOF

(71) Applicants: HYUNDAI MOTOR COMPANY, Seoul (KR); KIA MOTORS CORPORATION, Seoul (KR)

(72) Inventor: Jang Hun Jeong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 331 days.

(21) Appl. No.: 17/065,861

(22) Filed: Oct. 8, 2020

(65) Prior Publication Data
US 2021/0356026 A1    Nov. 18, 2021

(30) Foreign Application Priority Data
May 15, 2020    (KR) .......................... 10-2020-0058455

(51) Int. Cl.
*B60W 30/045* (2012.01)
*B60W 10/16* (2012.01)
*B60W 10/22* (2006.01)

(52) U.S. Cl.
CPC .......... *B60W 30/045* (2013.01); *B60W 10/16* (2013.01); *B60W 10/22* (2013.01); *B60W 2510/207* (2013.01); *B60W 2520/06* (2013.01); *B60W 2520/28* (2013.01); *B60W 2540/18* (2013.01); *B60W 2720/266* (2013.01); *B60W 2720/406* (2013.01)

(58) Field of Classification Search
CPC .... B60W 30/045; B60W 10/16; B60W 10/22; B60W 2510/207; B60W 2520/06; B60W 2520/28; B60W 2540/18; B60W 2720/266; B60W 2720/406
See application file for complete search history.

(56) References Cited

U.S. PATENT DOCUMENTS

| 6,478,708 | B2 * | 11/2002 | Krisher | F16H 48/295 |
| | | | | 475/150 |
| RE46,828 | E * | 5/2018 | Spillane | B60W 10/06 |
| 10,065,489 | B2 * | 9/2018 | Wang | F16H 48/36 |
| 2005/0121248 | A1 * | 6/2005 | Ushiroda | B60K 23/04 |
| | | | | 180/248 |

(Continued)

OTHER PUBLICATIONS

Torque-Management Systems D.Piyabongkarn et al, IEEE Control Systems Magazine Aug. 2010 (Year: 2010).*

*Primary Examiner* — Peter D Nolan
*Assistant Examiner* — Tanya C Sienko
(74) *Attorney, Agent, or Firm* — Morgan, Lewis & Bockius LLP

(57) ABSTRACT

An apparatus for controlling turning of a vehicle, a system having the same, and a method thereof are provided. The vehicle turning control apparatus include a processor to perform a control operation to determine whether a present situation is a normal turning situation based on steering angle information and wheel speed information of the vehicle, and operate an electronic limited slip differential (eLSD) by making an inner wheel slip based on a turning direction when an operation of the eLSD is failed in the normal turning situation; and a storage to store data obtained by the processor and an algorithm executed by the processor.

18 Claims, 16 Drawing Sheets

(56) References Cited

U.S. PATENT DOCUMENTS

| | | | |
|---|---|---|---|
| 2009/0062055 A1* | 3/2009 | Alfredson | F16H 48/11 |
| | | | 475/233 |
| 2009/0127014 A1* | 5/2009 | Ushiroda | B60W 10/02 |
| | | | 180/249 |
| 2016/0229290 A1* | 8/2016 | Chimner | B60K 23/0808 |
| 2017/0113506 A1* | 4/2017 | Tseng | B60G 17/0162 |
| 2017/0334488 A1* | 11/2017 | Takata | B62D 27/04 |
| 2017/0349167 A1* | 12/2017 | Fahland | B60W 10/22 |
| 2018/0162223 A1* | 6/2018 | Alfredson | B60K 17/16 |
| 2018/0257477 A1* | 9/2018 | Krueger | B60K 6/52 |
| 2018/0304917 A1* | 10/2018 | Michelis | B60W 10/16 |
| 2018/0362022 A1* | 12/2018 | Kasaiezadeh Mahabadi | |
| | | | B60W 30/045 |
| 2019/0337497 A1* | 11/2019 | Scheuerell | B60T 8/1755 |
| 2020/0324649 A1* | 10/2020 | Gully | B60K 17/356 |
| 2021/0197778 A1* | 7/2021 | Shi | B60T 8/1761 |
| 2021/0253089 A1* | 8/2021 | Nahidi | B60W 30/045 |
| 2022/0063365 A1* | 3/2022 | Chetty | B60G 17/0195 |

\* cited by examiner

APPARATUS FOR CONTROLLING TURNING OF VEHICLE, SYSTEM HAVING THE SAME, AND METHOD THEREOF

CROSS-REFERENCE TO RELATED APPLICATION

The present application claims the benefit of priority to Korean Patent Application No. 10-2020-0058455, filed on May 15, 2020 in the Korean Intellectual Property Office, the entire disclosure of which is incorporated herein by reference.

TECHNICAL FIELD

The present disclosure relates to an apparatus for controlling the turning of a vehicle, a system having the same, and a method thereof, and more particularly to an integrated controlling technology to improve agility of a vehicle when the vehicle turns.

BACKGROUND

In general, a differential gear is a device to maintain revolutions per minute (RPM) of left and right wheels to be different from each other such that driving torque of left and right driving shafts are equal to each other.

In such a differential gear, since an engine driving shaft is connected to left and right driving shafts to drive left and right wheels through a pinion gear and a side gear, an outer wheel turns with a rotation radius, which is greater than that of an inner wheel, when a vehicle turns during running, so the outer wheel should rotate more rapidly than the inner wheel, which is possible by a differential device.

When tires mounted on at the left and right sides of the vehicle are different in size, or the left and right tires have different dynamic rotations radiuses due to the difference between abrasion degrees in the running of the vehicle, a wheel having a smaller dynamic rotation radius should rotate more than a wheel having a larger dynamic rotation radius so as to allow the vehicle to linearly run. Accordingly, an ideal differential gear may increase the number of revolutions of the tire having the smaller dynamic rotation radius such that driving torques of both wheels are equal to each other.

An electronic Limited Slip Differential (eLSD) is a device to distribute a torque into left and right torques by controlling the differential gear based on clutch control.

Such an eLSD is not controlled integrally with another system such as an active suspension and/or through the operation together with another system such as an active suspension.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus for controlling turning of a vehicle, capable of improving turning agility, through integrated control to avoid a situation, in which the operation of the eLSD is prohibited, by inducing a wheel slip through load movement using an active suspension, a system having the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling turning of a vehicle may include a processor to perform a control operation to determine whether a present situation is a normal turning situation based on steering angle information and wheel speed information of the vehicle, and to operate an electronic limited slip differential (eLSD) by making an inner wheel slip, which is determined based on a turning direction of the vehicle, when an operation of the eLSD is failed in the normal turning situation, and a storage to store data obtained by the processor and an algorithm executed by the processor.

According to an exemplary embodiment, the processor may determine the turning direction based on the steering angle information of the vehicle.

According to an exemplary embodiment, the processor may compare a wheel speed of an outer wheel with a wheel speed of an inner wheel, and determine the present situation as being the normal turning situation when the wheel speed of the outer wheel is greater than the wheel speed of the inner wheel.

According to an exemplary embodiment, the processor may determine the operation of the eLSD as being failed when an under steer index is greater than a preset critical value in the normal turning situation.

According to an exemplary embodiment, the processor may perform a control operation such that a wheel speed of an inner wheel becomes greater than a wheel speed of an outer wheel by making the inner wheel slip.

According to an exemplary embodiment, the processor may make the inner wheel slip by generating normal force through an active suspension to move a load of the vehicle outward from the turning direction.

According to an exemplary embodiment, the processor may operate the eLSD when an under steer index is equal to or less than a preset critical value.

According to another aspect of the present disclosure, a vehicle system may include an electronic limited slip differential (eLSD) to transmit driving torque to an outer wheel, which is determined based on a turning direction, when a vehicle turns, an active suspension to control normal force applied to an inner wheel and the outer wheel, and a processor configured to perform a control operation to determine whether a present situation is a normal turning situation based on steering angle information and wheel speed information of a vehicle, and to operate the eLSD by making an inner wheel slip through the active suspension when an operation of the eLSD is failed in the normal turning situation.

According to an exemplary embodiment, the processor may determine the turning direction based on the steering angle information of the vehicle.

According to an exemplary embodiment, the processor may compare a wheel speed of an outer wheel with a wheel speed of an inner wheel, and determine the present situation as being the normal turning situation when the wheel speed of the outer wheel is greater than the wheel speed of the inner wheel.

According to an exemplary embodiment, the processor may determine the operation of the eLSD as being failed when an under steer index is greater than a preset critical value in the normal turning situation.

According to an exemplary embodiment, the processor may perform a control operation such that a wheel speed of an inner wheel becomes greater than a wheel speed of an outer wheel by making the inner wheel slip.

According to an exemplary embodiment, the processor may make the inner wheel slip by generating normal force through the active suspension to move a load of the vehicle outward from the turning direction.

According to another aspect of the present disclosure, a method of controlling turning of a vehicle may include determining whether a present situation is a normal turning situation based on steering angle information and wheel speed information of the vehicle, determining whether an operation of an eLSD is failed in the normal turning situation, and performing a control operation to operate the eLSD by making an inner wheel slip, which is determined based on a turning direction of the vehicle, when the operation of the eLSD is failed in the normal turning situation.

According to an exemplary embodiment, the determining whether a present situation is a normal turning situation may include determining the turning direction based on the steering angle information of the vehicle.

According to an exemplary embodiment, the determining whether a present situation is a normal turning situation may further include comparing a wheel speed of an outer wheel with a wheel speed of an inner wheel, and determining the present situation as being the normal turning situation when the wheel speed of the outer wheel is greater than the wheel speed of the inner wheel.

According to an exemplary embodiment, the determining whether an operation of an eLSD is failed in the normal turning situation may include determining the operation of the eLSD as being failed when an under steer index is greater than a preset critical value in the normal turning situation.

According to an exemplary embodiment, the performing a control operation to operate the eLSD may include performing a control operation such that a wheel speed of an inner wheel becomes greater than a wheel speed of an outer wheel by making the inner wheel slip.

According to an exemplary embodiment, the performing a control operation to operate the eLSD may include making the inner wheel slip by controlling normal force applied to each of an outer wheel and an inner wheel of the vehicle to shift a load of the vehicle outward from the turning direction.

According to an exemplary embodiment, the determining whether an operation of an eLSD is failed may include determining the operation of the eLSD as being operable when an under steer index is equal to or less than a preset critical value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
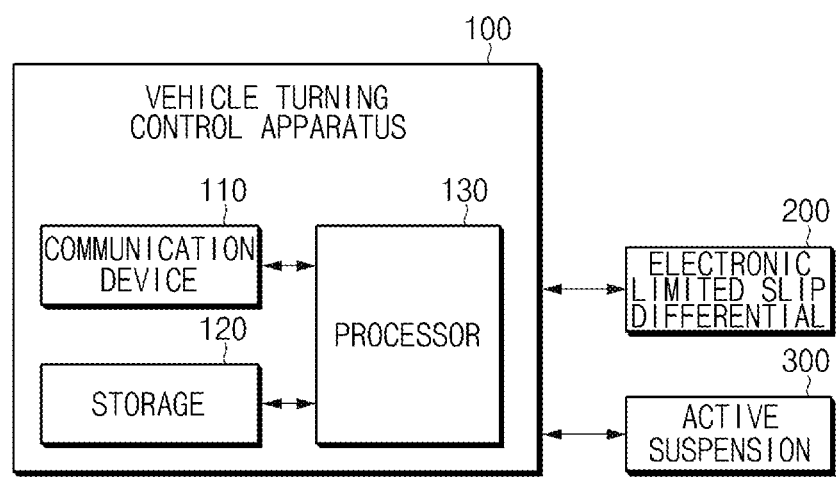
FIG. 1 is a block diagram illustrating the configuration of a vehicle system including an apparatus for controlling turning of a vehicle, according to an exemplary embodiment of the present disclosure.

Hereinafter, some embodiments of the present disclosure will be described in detail with reference to accompanying drawings. In the following description, the same reference numerals will be assigned to the same components even though the components are illustrated in different drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. The terms are used only to distinguish relevant components from other components, and the nature, the order, or the sequence of the relevant components is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

The present disclosure discloses a configuration to improve turning agility of a vehicle by increasing an operating region of an electronic limited slip differential, by operating together with an active suspension.

Hereinafter, exemplary embodiments of the present disclosure will be described with reference to FIGS. 1 to 10.

FIG. 1 is a block diagram illustrating the configuration of a vehicle system including an apparatus for controlling the turning of a vehicle, according to an exemplary embodiment of the present disclosure.

Referring to FIG. 1, according to an exemplary embodiment of the present disclosure, an apparatus (vehicle turning control apparatus) 100 for controlling the turning of a vehicle may be implemented inside a vehicle. In this case, the vehicle turning control apparatus 100 may be formed integrally with the internal control units of the vehicle or may be implemented separately from the internal control units of the vehicle to be connected with the internal control units of the vehicle through a separate connector. In particular, according to the present disclosure, the vehicle turning control apparatus 100 may integrally control an eLSD 200 and an active suspension 300.

Referring to FIG. 1, the vehicle system may include the vehicle turning control apparatus 100, the eLSD 200, and the active suspension 300.

The vehicle turning control apparatus 100 may integrally control the eLSD 200 and the active suspension 300, under a normal turning situation and a limited turning situation of a vehicle.

Figure 2:
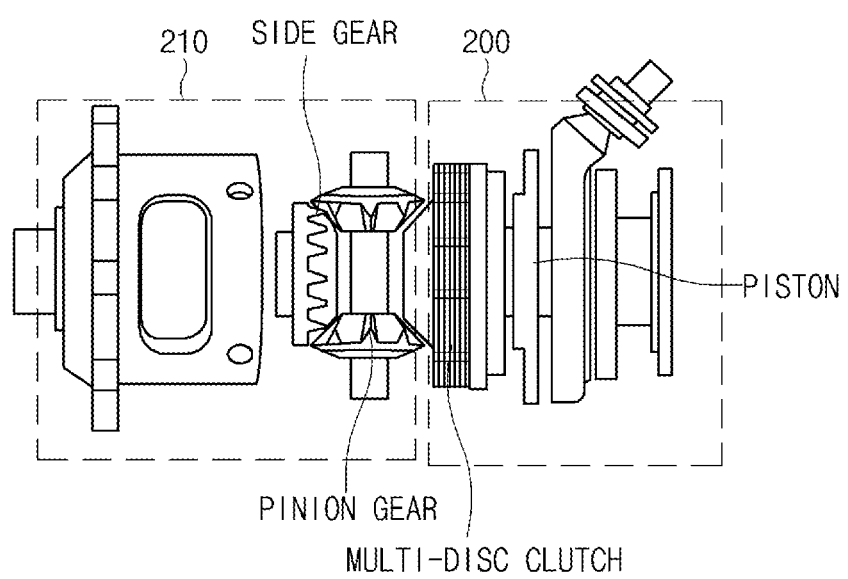
FIG. 2 is a view illustrating a detailed structure of a differential gear and an eLSD, according to an exemplary embodiment of the present disclosure.

The eLSD 200 is a device to control a differential gear based on clutch control to turn the vehicle by distributing torque into left torque and right torque. The eLSD 200 transmits driving torque from a wheel having a higher wheel speed to a wheel having a lower wheel speed such that the vehicle turns rapidly. FIG. 2 is a view illustrating a structure in which the eLSD 200 is connected to a differential gear 210, according to an exemplary embodiment of the present disclosure. Referring to FIG. 2, the differential gear 210 transmits driving force to a vehicle wheel, and the eLSD 200 controls driving torque transmitted to the vehicle wheel. In this case, the driving force refers to force to overcome a movement resistance when a machine is moved or a ship or vehicle is driven at a specific speed.

In other words, when a multi-disc clutch of the eLSD 200 is not engaged, equal driving torque is transmitted to left and right vehicle wheels, which is identical to the function of a normal differential gear 210. When the multi-disc clutch is engaged, as the left and right vehicle wheels have the equal number of revolutions, the driving torque is transmitted to one vehicle wheel.

The active suspension 300 includes an additional actuator between a vehicle body and a tire of the vehicle to actively control the posture of the vehicle body. The active suspension 300 may perform roll control, pitch control, and bounce control of the vehicle.

The vehicle turning control apparatus 100 may increase the operating region of the eLSD by inducing the slip (inner wheel slip) of an inner wheel of the vehicle by shifting a load to an outer wheel using the active suspension 300 in order to reduce under steer when the operation of the eLSD 200 is prohibited as the risk of an under steer vehicle is increased after the operation of the eLSD 200.

The vehicle turning control apparatus 100 may include a communication device 110, a storage device 120, and a processor 130.

The communication device 110, which is a hardware device implemented with various electronic circuits to transmit and receive a signal through wireless or wired connection, may make in-vehicle communication through controller area network (CAN) communication or local interconnect network (LIN) communication, or Flex-Ray communication.

As an example, the communication device 110 may receive steering angle information, information (wheel speed information) on a wheel speed, or information on the operation of the eLSD from in-vehicle devices.

The storage device 120 may store steering angle information, wheel speed information, or operation information of the eLSD, which is received by the communication device 110, data obtained by the processor 130, or data/an algorithm necessary for the operation of the vehicle turning control apparatus 100.

The storage device 120 may be implemented with at least one non-transitory storage medium of a flash type memory, a hard disk type memory, a micro type memory, a card type memory (e.g., a Security Digital (SD) card or an eXtreme digital card), a Random Access Memory (RAM), a Static Random Access Memory (SRAM), a Read Only Memory (ROM), a Programmable Read Only Memory (PROM), an Electrically Erasable and Programmable ROM (EEPROM), a magnetic RAM (MRAM), a magnetic disk, or an optical disk-type memory.

The processor 130 may be electrically connected with the communication device 110 and the storage device 120, may electrically control each component, and may be an electric circuit that executes software commands. Accordingly, the processor 130 may perform various data processing and calculation, to be described below. The processor 130 may be, for example, an electronic control unit (ECU), a micro controller unit (MCU), or another lower-level controller mounted in the vehicle.

The processor 130 may determine whether a present situation is the normal turning situation, based on the steering information and the wheel speed information of the vehicle. When the operation of the eLSD is failed in the normal turning situation, the processor 130 controls the eLSD to operate by making an inner wheel slip.

Figure 3A:
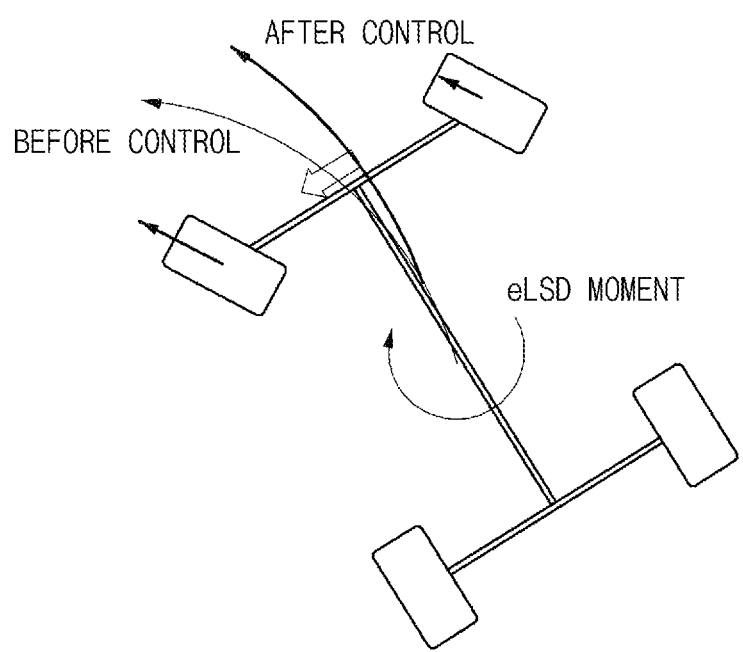
FIG. 3A is a view illustrating normal turning of a vehicle, according to an exemplary embodiment of the present disclosure.

The processor 130 may determine the turning direction based on information (steering angle information) on a steering angle of the vehicle, and may compare a wheel speed of an outer wheel with a wheel speed of an inner wheel. The "outer" wheel may refer to a wheel of the vehicle on an outer side of a rotation radius when the vehicle is steered, and the "inner" wheel may refer to a wheel on an inner side of the rotation radius. When the wheel speed of the outer wheel is greater than the wheel speed of the inner wheel, the processor 130 may determine the present situation as being the normal turning situation. Meanwhile, the processor 130 may determine the present situation as being a limited turning situation when the wheel speed of the outer wheel is equal to or less than the wheel speed of the inner wheel. FIG. 3A is a view illustrating normal turning of a vehicle, according to an exemplary embodiment of the present disclosure, and FIG. 3B is a view illustrating limited turning of a vehicle, according to an exemplary embodiment of the present disclosure.

Referring to FIG. 3A, when the vehicle performs the normal turning, that is, when the wheel speed of the outer wheel is greater than the wheel speed of the inner wheel in turning, the driving torque is transmitted to an inner wheel, which produces a yaw damping effect. In this case, when the vehicle oversteers, turning stability may be improved. However, when the vehicle understeers, the risk of the vehicle may be increased, so the operation of the eLSD 200 is prohibited. Therefore, according to the present disclosure, a control operation is performed to shift the load of the vehicle outward with respect to the turning direction using the active suspension 300, thereby inducing a wheel slip in the inner wheel, such that the wheel speed of the inner wheel becomes the wheel speed of the outer wheel. In this case, the under steer is a phenomenon in which a rotation radius of the vehicle is increased as compared with the angle of the steering wheel when the vehicle turns at a corner, which causes the vehicle to be out of a target line intended by the driver. In addition, the over steer is a phenomenon in which the rotation radius of the vehicle is decreased as compared with the angle of the steering wheel when the vehicle turns at the corner, which causes the vehicle to turn more sharply than a turning degree intended by the driver.

Figure 3B:
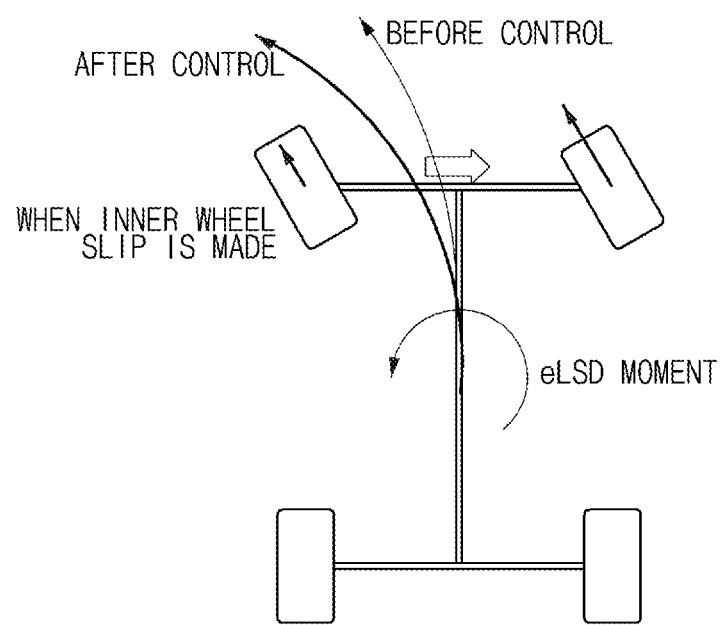
FIG. 3B is a view illustrating limited turning of a vehicle, according to an exemplary embodiment of the present disclosure.

Referring to FIG. 3B, when a vehicle performs limited turning, that is, when the wheel speed of the outer wheel is equal to or less than the wheel speed of the inner wheel, driving torque is transmitted to the outer wheel, so the turning agility is increased. When the vehicle oversteers, the vehicle risk is increased, so the operation of the vehicle turning control apparatus 100 is prohibited. When the vehicle understeers, the agility of the turning is improved, so an under steer characteristic is reduced. When the vehicle oversteers, the load of the vehicle is shifted outward, so the inner wheel slip is made.

When an under steer index is greater than a preset critical value under the normal turning situation, the processor 130 may determine the operation of the vehicle turning control apparatus as being failed. In other words, when the vehicle having the under steer tendency performs the normal turning, a dangerous situation may be caused. Accordingly, the inner wheel slip is made to reduce the under steer tendency, so the wheel speed of the inner wheel is controlled to be faster than the wheel speed of the outer wheel.

The processor 130 may generate normal force through the active suspension to shift the load of the vehicle towards an outer wheel of the turning direction, thereby making the inner wheel slip. In this case, the normal force refers to force applied in a Z axis direction.

The processor 130 may operate the eLSD when the under steer index is equal to or less than the preset critical value.

Figure 4:
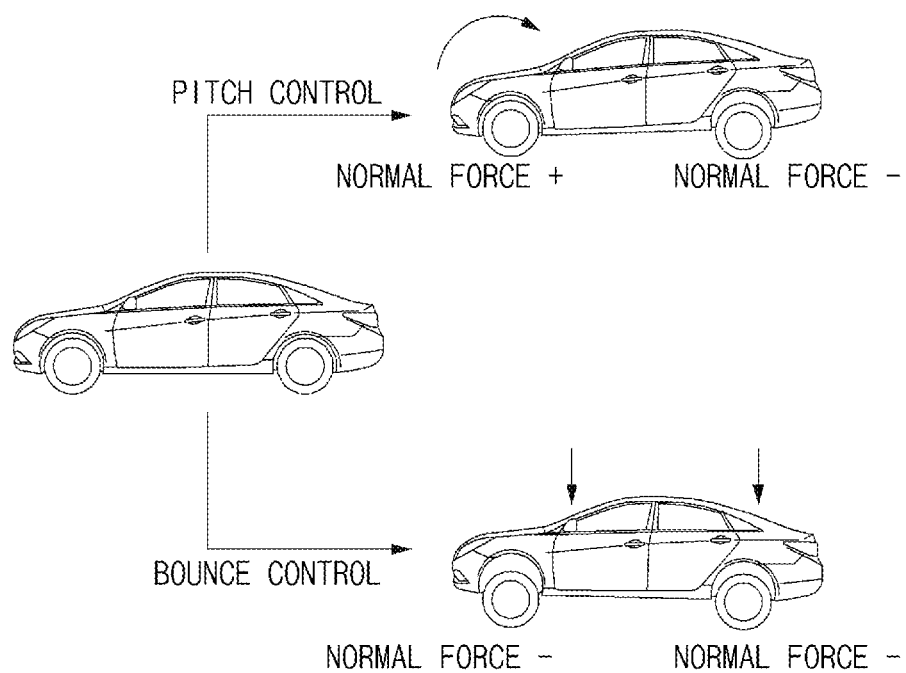
FIG. 4 is a view illustrating control of normal force of an active suspension, according to an exemplary embodiment of the present disclosure.

FIG. 4 is a view illustrating control of normal force of an active suspension, according to an exemplary embodiment of the present disclosure. Referring to FIG. 4, the active suspension 300 may perform pitch control or bounce control by differently controlling normal force for wheels of the vehicle.

Figure 5A:
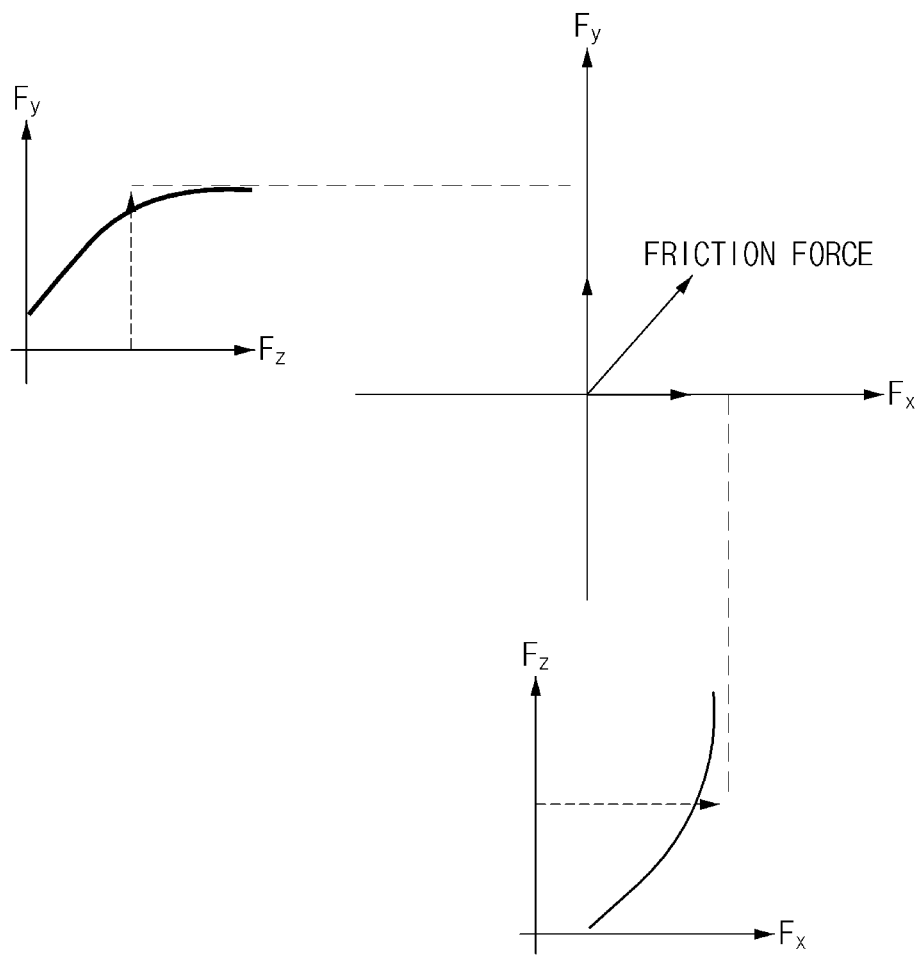
FIGS. 5A and 5B are views illustrating a characteristic of a tire friction source by an active suspension, according to an exemplary embodiment of the present disclosure.
Figure 5B:
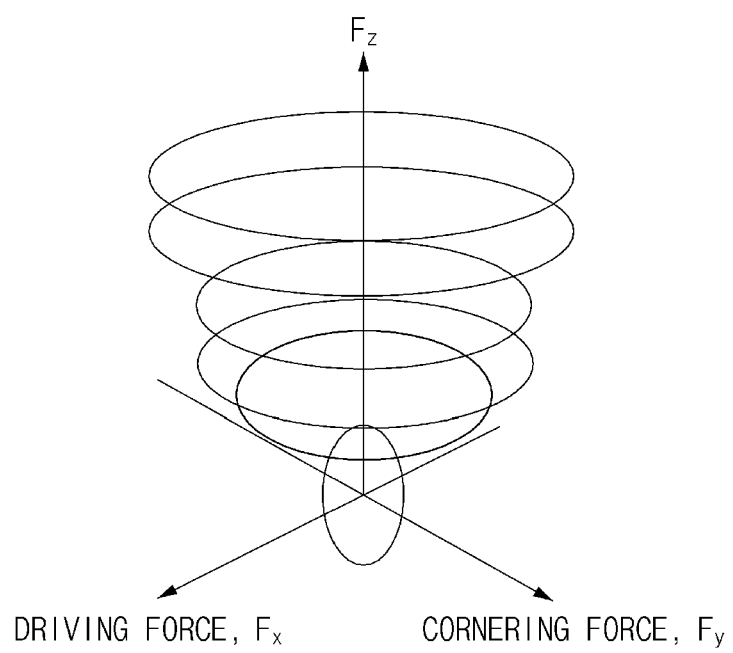

FIGS. 5A and 5B are views illustrating a characteristic of a tire friction source by an active suspension, according to an exemplary embodiment of the present disclosure. Referring to FIG. 5A, it may be understood that driving force "Fx" and cornering force "Fy" are increased as normal force "Fz" is increased. FIG. 5B illustrates the normal force "Fz", the driving force "Fx", and the cornering force "Fy" in the form of a graph. In other words, the cornering force, which is generated as a tire skids laterally, is increased in proportion to an angle between the rotational surface and the forward direction of the tire, and influenced by the air pressure of a tire, the size of the tire, and a suspension type of the tire.

Figure 6:
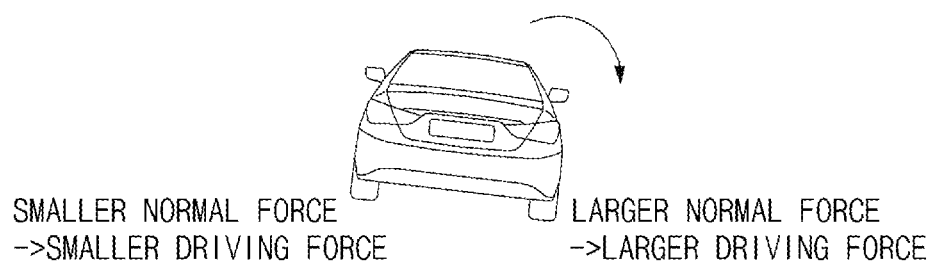
FIG. 6 is a view illustrating that a wheel slip is induced by normal force, according to an exemplary embodiment of the present disclosure.

FIG. 6 illustrates that a wheel slip is induced by normal force, according to an exemplary embodiment of the present disclosure. Referring to FIG. 6, the difference in driving force is made due to the difference in normal force. When equal driving torque is applied to left and right driving shafts, the wheel slip of one wheel occurs due to the difference between the wheel speeds of the left and right wheels. For example, a wheel slip of an inner wheel occurs due to a difference in a normal force applied in the inner wheel and an outer wheel.

Figure 7A:
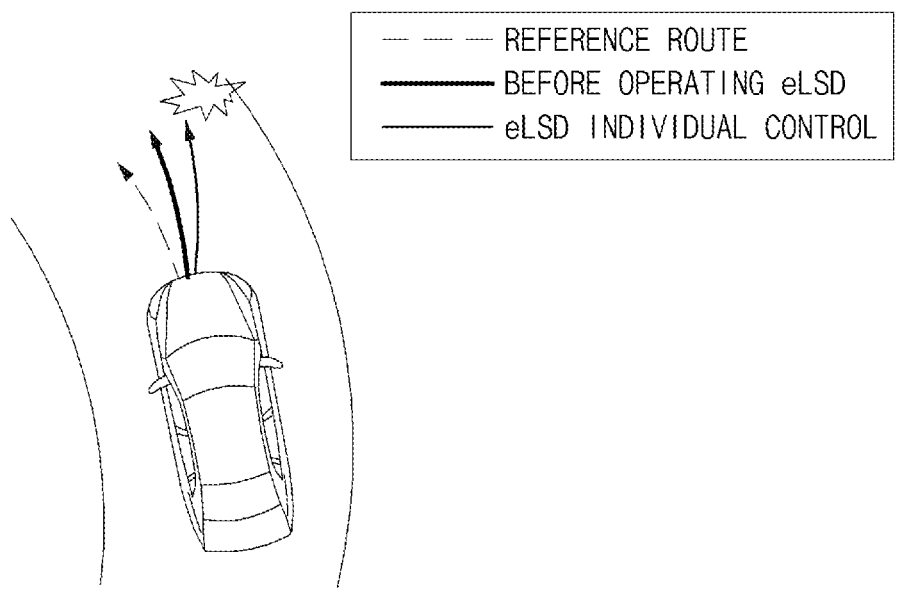
FIG. 7A is a view illustrating a forward direction of a vehicle when an eLSD individually operates, according to an exemplary embodiment of the present disclosure.
Figure 7B:
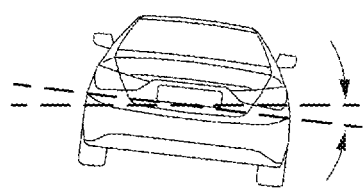
FIG. 7B is a view illustrating rolling of a vehicle when an eLSD individually operates, according to an exemplary embodiment of the present disclosure.
Figure 7C:
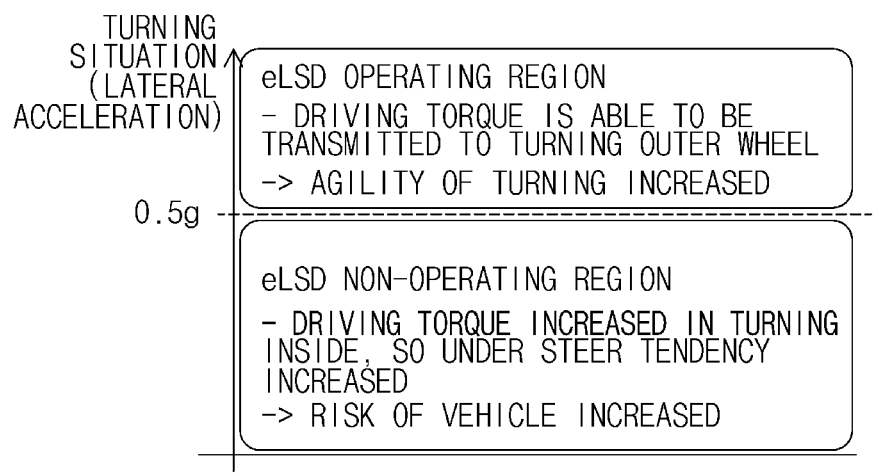
FIG. 7C is a view illustrating an operating region and a non-operating region of an eLSD when the eLSD individually operates, according to an exemplary embodiment of the present disclosure.

FIGS. 7A, 7B, and 7C illustrate a method for controlling normal turning through individual control of an eLSD, according to an exemplary embodiment of the present disclosure.

Referring to FIG. 7A, when a vehicle having an understeer tendency turns outwards from a reference route on a road and when the vehicle turning control apparatus individually operates, the vehicle turns more outward, so collision may occur. In this case, as illustrated in FIG. 7B, the roll of the vehicle is stable. As illustrated in FIG. 7C, when the lateral acceleration of the vehicle having the understeer tendency exceeds the preset critical value (e.g., 0.5 G) and when the vehicle turning control apparatus operates, driving torque of the outer wheel is transmitted to an inner wheel, to increase the agility of the turning (the operating region of the eLSD). To the contrary, when the lateral acceleration of the vehicle is equal to or less than the preset critical value (e.g., 0.5 G), and when the vehicle turning control apparatus 100 operates, the driving torque of the inner wheel is increased, so the under steer tendency is increased. Accordingly, the risk of the vehicle may be increased to stop the operation of the eLSD (a non-operating region of the eLSD).

For example, it may be understood that the operating region of the eLSD is separated from the non-operating region of the eLSD based on the lateral acceleration of 0.5G, and it may be understood that the non-operating region of the eLSD is wider than the operating region of the eLSD.

Figure 8A:
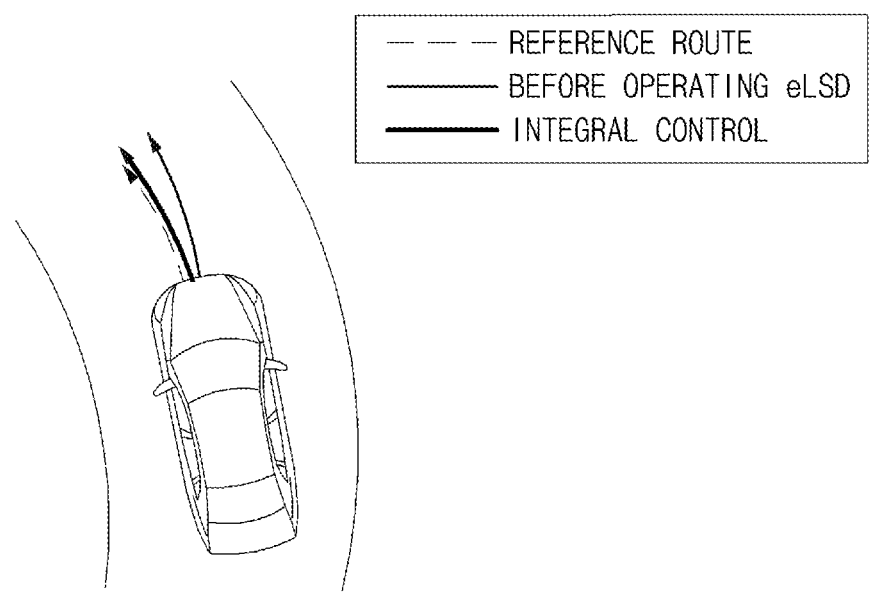
FIG. 8A is a view illustrating a forward direction of a vehicle when an eLSD integrally operates, according to an exemplary embodiment of the present disclosure.
Figure 8B:
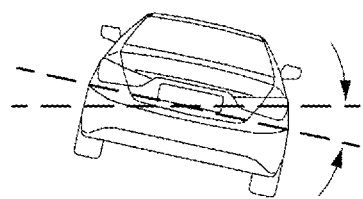
FIG. 8B is a view illustrating rolling of a vehicle when an eLSD integrally operates, according to an exemplary embodiment of the present disclosure.
Figure 8C:
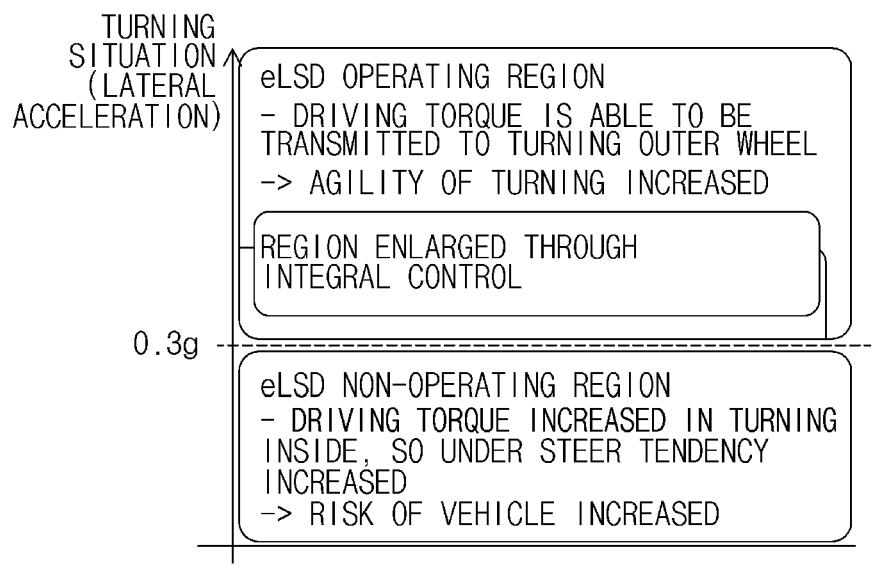
FIG. 8C is a view illustrating an operating region and a non-operating region of an eLSD when the eLSD integrally operates, according to an exemplary embodiment of the present disclosure.

FIGS. 8A, 8B, and 8C illustrate a method for controlling normal turning through integral control of an eLSD, according to an exemplary embodiment of the present disclosure.

Referring to FIG. 8A, it may be understood that when the vehicle having the under steer tendency turns outwards from the reference route on a road, the eLSD 200 and the active suspension 300 are integrally controlled such that the vehicle is running close to the reference route. In this case, as illustrated in FIG. 8B, the roll of the vehicle is slightly higher, which is different from FIG. 7B. As illustrated in FIG. 8C, when the lateral acceleration of the vehicle having the under steer tendency exceeds the preset critical value (e.g., 0.3G) and when the eLSD operates, driving torque of the outer wheel is transmitted to an inner wheel, to increase the agility of the turning (the operating region of the eLSD). To the contrary, when the lateral acceleration of the vehicle is equal to or less than the preset critical value (e.g., 0.3G), and when the eLSD operates, the driving torque of the inner wheel in turning is increased, so the under steer tendency is increased. Accordingly, the risk of the vehicle may be increased to stop the operation of the vehicle turning control apparatus (a non-operating region of the eLSD).

For example, it may be understood that the operating region of the eLSD is separated from the non-operating region of the eLSD based on the lateral acceleration of 0.5G, and it may be understood that the non-operating region of the eLSD is wider than the operating region of the eLSD.

As described above, according to the present disclosure, the operating region of an eLSD is increased through the operation together with the active suspension, thereby more efficiently controlling the vehicle turning.

Figure 9:
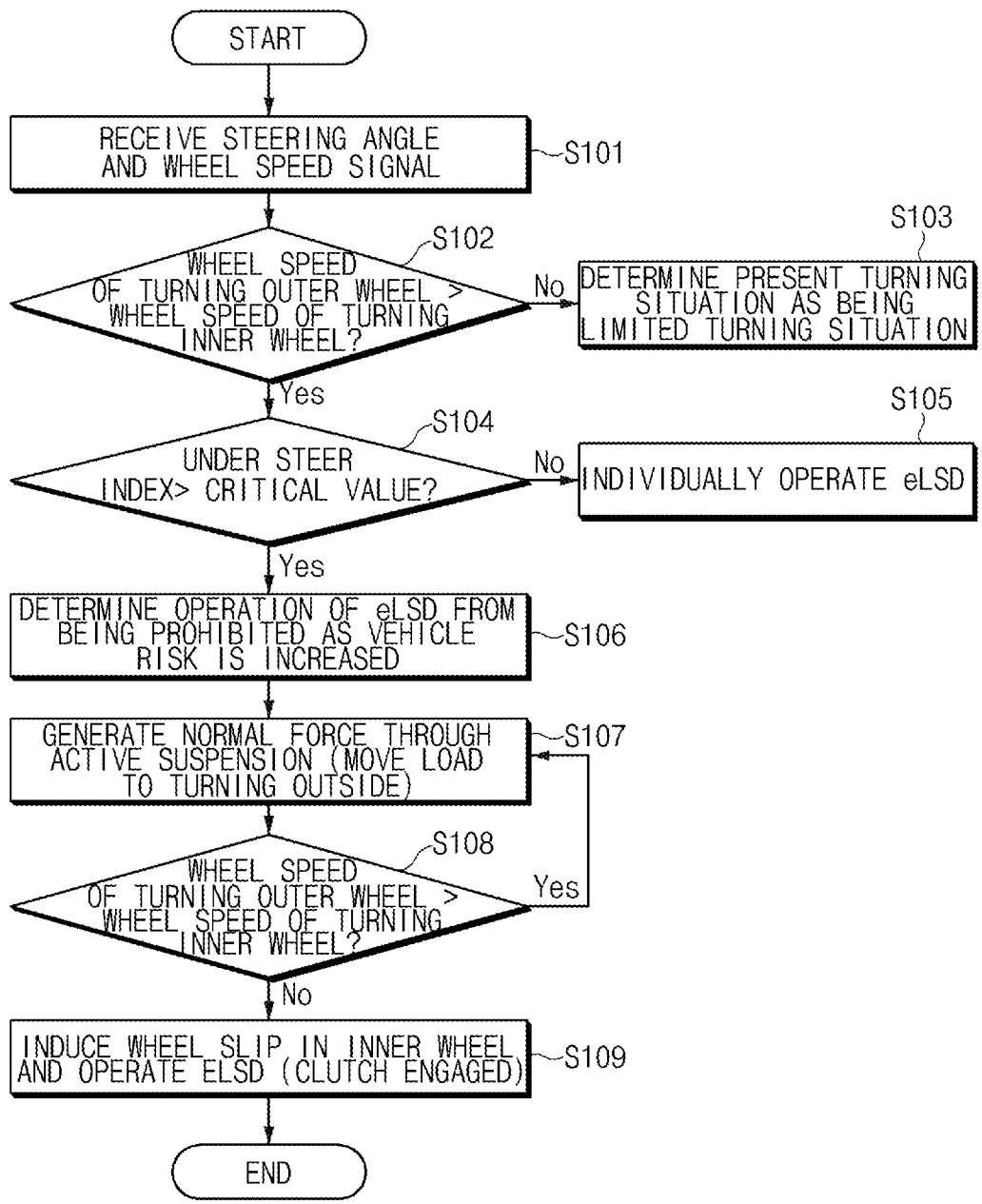
FIG. 9 is a flowchart illustrating an integrated control method in turning of a vehicle, according to an exemplary embodiment of the present disclosure.

Hereinafter, a method for controlling the turning of a vehicle will be described in detail according to an exemplary embodiment of the present disclosure. FIG. 9 is a flowchart illustrating the method for controlling the turning of the vehicle, according to an exemplary embodiment of the present disclosure.

Hereinafter, it is assumed that the vehicle turning control apparatus 100 of FIG. 1 performs the process shown in FIG. 9. In addition, in the following description made with reference to FIG. 9, it may be understood that the operation described as being performed by vehicle turning control apparatus 100 is controlled by the processor 130 of the vehicle turning control apparatus 100.

Referring to FIG. 9, the vehicle turning control apparatus 100 receives a steering angle and a wheel speed signal from an in-vehicle device through CAN communication (S101), and determines a turning direction based on a steering angle sign, and determines, based on a wheel speed, whether the wheel speed of an outer wheel is greater than the wheel speed of an inner wheel to determine whether a present turning situation is a normal turning situation or a limited turning situation (S102). When the wheel speed of the outer wheel is equal to or less than the wheel speed of the inner wheel, the vehicle turning control apparatus 100 determines that the present turning situation is the limited turning situation as illustrated in FIG. 3 (S103).

For example, the vehicle turning control apparatus 100 may determine the vehicle as turning left when the steering angle has a plus (+) sign, and may determine the vehicle as turning right when the steering angle has a minus (−) sign.

In addition, the vehicle turning control apparatus 100 may determine the present situation as a limited turning situation to the left, when the steering angle has a plus (+) sign and when the wheel speed of the left front wheel (FL) is greater than the wheel speed of the right front wheel (FR). To the contrary, the vehicle turning control apparatus 100 may determine the present situation as a normal turning situation to the right, when the steering angle has a plus (+) sign and when the wheel speed of the left front wheel (FL) is equal to or less than the wheel speed of the right front wheel (FR).

When the outer wheel speed is greater than the inner wheel speed, the vehicle turning control apparatus 100 determines that the present turning situation is the normal turning situation and determines whether an under steer index of the vehicle is greater than a specific critical value (S104). In this case, the vehicle turning control apparatus 100 may receive information on the under steer index from the eLSD 200.

When the under steer index of the vehicle is equal to or less than the preset critical value, the vehicle turning control apparatus 100 individually operates the eLSD 200 (S105). In other words, in the normal turning, the driving torque is transmitted to the inner wheel to produce a yaw damping effect. When the vehicle oversteers, the turning stability may be improved.

Meanwhile, when the under steer index of the vehicle is greater than the preset critical value, the vehicle turning control apparatus 100 determines the operation of the eLSD 200 from being prohibited as the vehicle risk is increased (S106).

In other words, the vehicle turning control apparatus 100 may determine whether the present situation is the normal turning situation or the limited turning situation, based on the steering angle and the wheel speed. When the under steer index is greater than the preset critical value in the normal turning situation, the vehicle turning control apparatus 100 may determine the operation of the eLSD 200 as being prohibited.

Thereafter, the vehicle turning control apparatus 100 generates the normal force through the active suspension 300 to shift a load to an outer wheel of a turning direction (S107) In this case, as the normal force of the tire is increased, the driving force and the cornering force are increased. The difference between normal forces applied to the outer wheel and the inner wheel of the vehicle makes the difference in driving force. Accordingly, when equal driving torque is applied to the left and right driving shafts, the wheel slip of one wheel occurs due to the difference between left and right wheel speeds. For example, a wheel slip of an inner wheel occurs due to a difference in a normal force applied in the inner wheel and an outer wheel. In other words, the vehicle turning control apparatus 100 generates normal force to the extent that the slip of the inner wheel is generated.

The vehicle turning control apparatus 100 determines whether the wheel speed of the outer wheel is greater than the wheel speed of the inner wheel (S108) and induces the wheel slip of the inner wheel until the wheel speed of the outer wheel is equal to or less than the wheel speed of the inner wheel.

When the wheel speed of the outer wheel is equal to or less than the wheel speed of the inner wheel, that is, when the wheel speed of the inner wheel is greater than the wheel speed of the outer wheel, the wheel slip is made in the inner wheel, and the clutch of the eLSD 200 is coupled for operation. In this case, when the clutch is engaged, the driving torque is transmitted from a wheel having a higher speed to a wheel having a lower speed, to improve the turning performance of the vehicle.

Accordingly, when the eLSD 200 enters the non-operating region, the load is moved towards the an outer wheel of a turning direction using the normal force through the active suspension 300. Accordingly, the wheel slip is induced in the inner wheel in turning, thereby enabling the operation of the eLSD 200 (S109).

As described above, according to the present disclosure, when the slip is not generated in the inner wheel but the vehicle under steers, and if the eLSD operates, the risk of the vehicle is increased, so the operation of the eLSD is prohibited. However, as the load is shifted towards the outer wheel through the active suspension, the inner wheel slip is induced to increase the operating region of the eLSD, thereby improving the agility of the vehicle.

Figure 10:
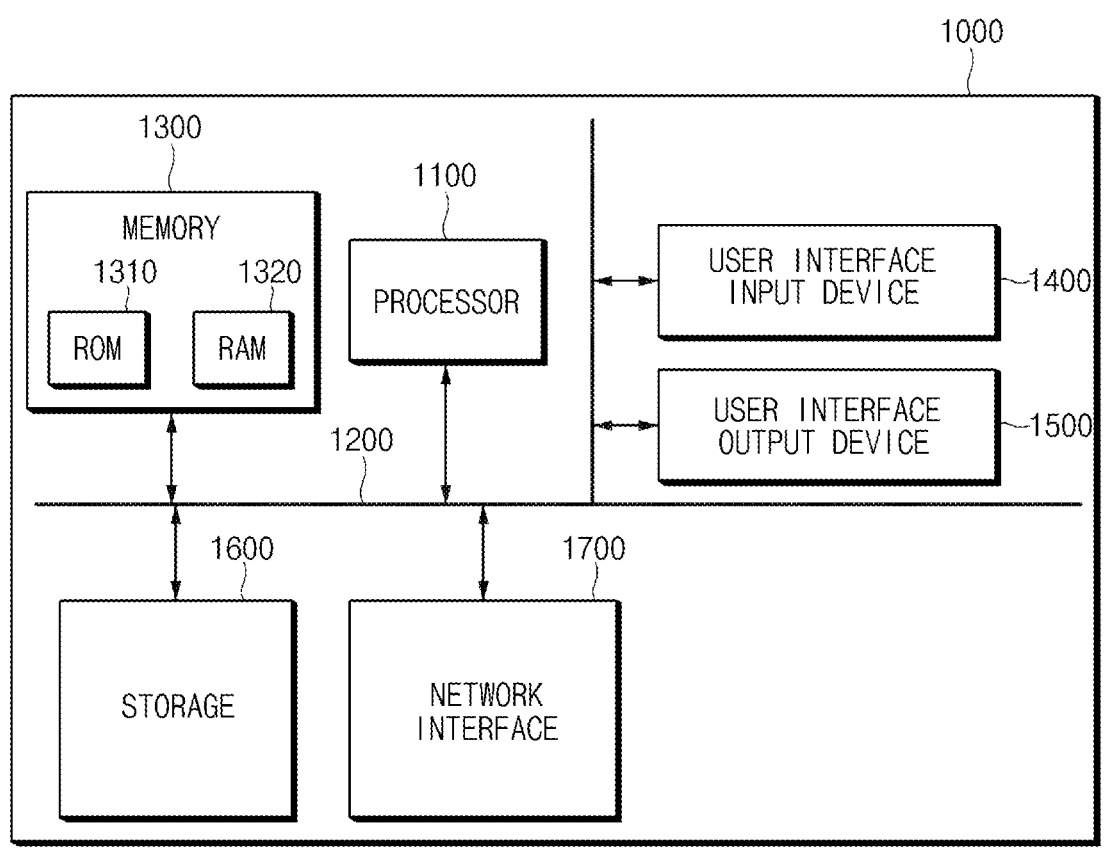
FIG. 10 illustrates a computing system, according to an exemplary embodiment of the present disclosure.

FIG. 10 illustrates a computing system, according to an exemplary embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200. According to one exemplary embodiment of the present disclosure, the computer system 1000 in FIG. 10 may be an exemplary structure of the vehicle turning control apparatus 100.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to the present disclosure, the turning agility may be improved through integrated control to avoid the situation, in which the operation of the eLSD is prohibited, by inducing the wheel slip through load movement using the active suspension.

Besides, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for controlling turning of a vehicle, the apparatus comprising:
   a processor configured to perform a control operation to determine whether a present situation is a normal turning situation based on steering angle information and wheel speed information of the vehicle, to determine an inner wheel based on a turning direction of the vehicle, and to operate an electronic limited slip differential (eLSD) by making an inner wheel slip when an operation of the eLSD is failed in the normal turning situation; and
   a storage configured to store data obtained by the processor and an algorithm executed by the processor,
   wherein the processor is further configured to make the inner wheel slip by generating normal force through an active suspension to shift a load of the vehicle outward from the turning direction.

2. The apparatus of claim 1, wherein the processor is further configured to
   determine the turning direction based on the steering angle information of the vehicle.

3. The apparatus of claim 1, wherein the processor is further configured to:
   compare a wheel speed of an outer wheel with a wheel speed of the inner wheel, and
   determine the present situation as being the normal turning situation when the wheel speed of the outer wheel is greater than the wheel speed of the inner wheel.

4. The apparatus of claim 1, wherein the processor is further configured to
   determine the operation of the eLSD as being failed when an under steer index is greater than a preset critical value in the normal turning situation.

5. The apparatus of claim 1, wherein the processor is further configured to
   perform the control operation such that a wheel speed of the inner wheel becomes greater than a wheel speed of an outer wheel by making the inner wheel slip.

6. The apparatus of claim 1, wherein the processor is further configured to
   operate the eLSD when an under steer index is equal to or less than a preset critical value.

7. A vehicle system comprising:
   an electronic limited slip differential (eLSD) to transmit driving torque to an outer wheel, which is determined based on a turning direction of the vehicle, when a vehicle turns;
   an active suspension to control normal force applied to an inner wheel and the outer wheel; and
   a processor configured to perform a control operation to determine whether a present situation is a normal turning situation based on steering angle information and wheel speed information of a vehicle, to determine an inner wheel based on the turning direction, and to operate the eLSD by making an inner wheel slip through the active suspension when an operation of the eLSD is failed in the normal turning situation.

8. The vehicle system of claim 7, wherein the processor is further configured to determine the turning direction based on the steering angle information of the vehicle.

9. The vehicle system of claim 7, wherein the processor is further configured to:
   compare a wheel speed of the outer wheel with a wheel speed of the inner wheel, and
   determine the present situation as being the normal turning situation when the wheel speed of the outer wheel is greater than the wheel speed of the inner wheel.

10. The vehicle system of claim 9, wherein the processor is further configured to determine the operation of the eLSD as being failed when an under steer index is greater than a preset critical value in the normal turning situation.

11. The vehicle system of claim 7, wherein the processor is further configured to perform the control operation such that a wheel speed of the inner wheel becomes greater than a wheel speed of the outer wheel.

12. The vehicle system of claim 7, wherein the processor is further configured to make the inner wheel slip by generating normal force through the active suspension to shift a load of the vehicle outward from the turning direction.

13. A method of controlling turning of a vehicle, the method comprising:
   determining whether a present situation is a normal turning situation based on steering angle information and wheel speed information of the vehicle;
   determining whether an operation of an electronic limited slip differential (eLSD) is failed in the normal turning situation;
   determining an inner wheel based on a turning direction of the vehicle; and performing a control operation to operate the eLSD by making an inner wheel slip when the operation of the eLSD is failed in the normal turning situation, wherein the performing a control operation to operate the eLSD includes making the inner wheel slip by controlling normal force applied to each of an outer wheel and the inner wheel of the vehicle to shift a load of the vehicle outward from the turning direction.

14. The method of claim 13, wherein the determining whether a present situation is a normal turning situation includes determining the turning direction based on the steering angle information of the vehicle.

15. The method of claim 14, wherein the determining whether a present situation is a normal turning situation further includes:

comparing a wheel speed of the outer wheel with a wheel speed of the inner wheel; and determining the present situation as being the normal turning situation when the wheel speed of the outer wheel is greater than the wheel speed of the inner wheel.

16. The method of claim 13, wherein the determining whether an operation of an eLSD is failed in the normal turning situation includes determining the operation of the eLSD as being failed when an under steer index is greater than a preset critical value in the normal turning situation.

17. The method of claim 13, wherein the performing a control operation to operate the eLSD includes performing the control operation such that a wheel speed of the inner wheel becomes greater than a wheel speed of the outer wheel.

18. The method of claim 13, wherein the determining whether an operation of an eLSD is failed includes determining the operation of the eLSD as being operable when an under steer index is equal to or less than a preset critical value.

* * * * *